Aug. 18, 1925.  
R. M. CORL  
1,550,428  
MANUFACTURE OF SHEET GLASS  
Filed Oct. 12, 1922  
5 Sheets-Sheet 1
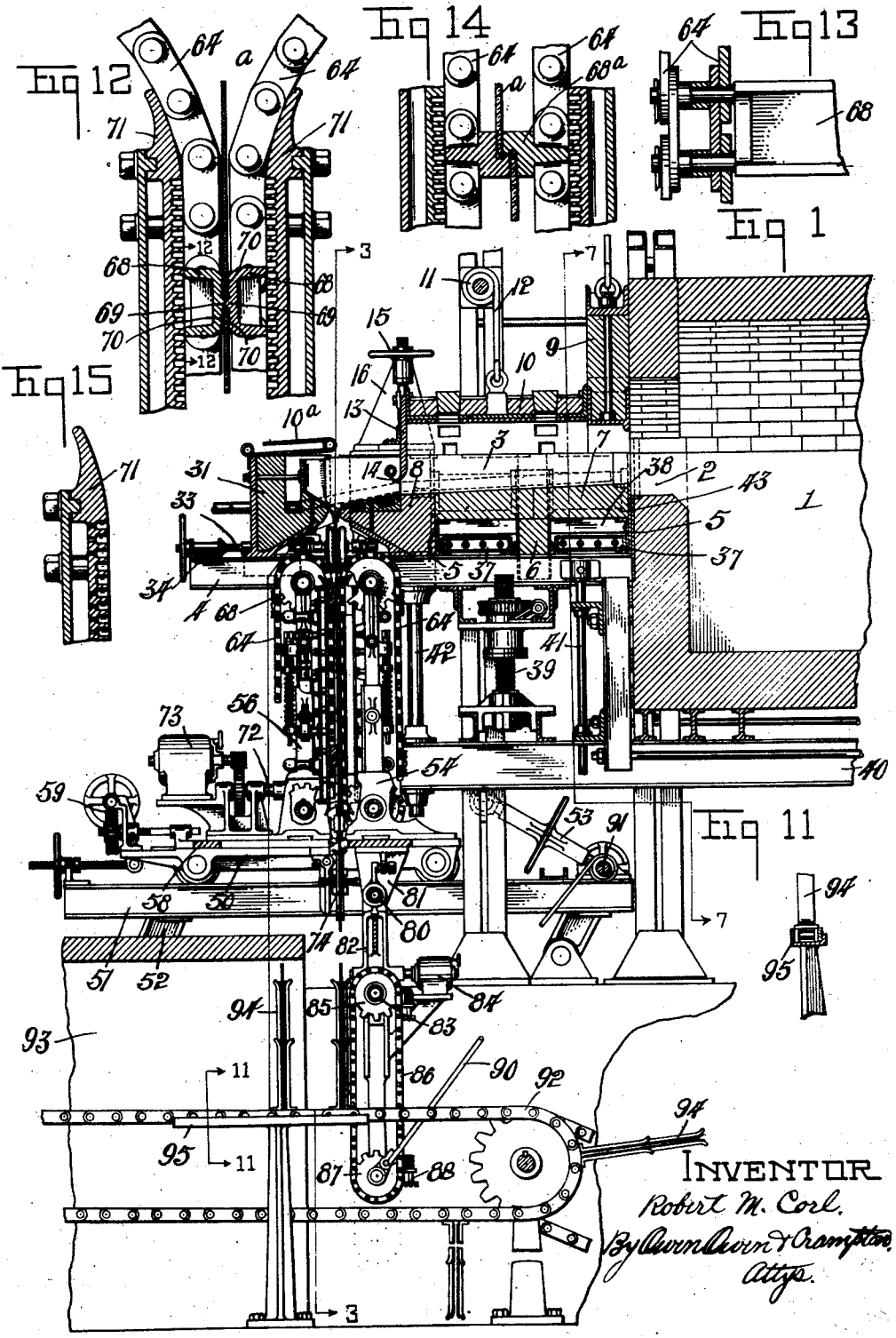
INVENTOR  
Robert M. Corl.

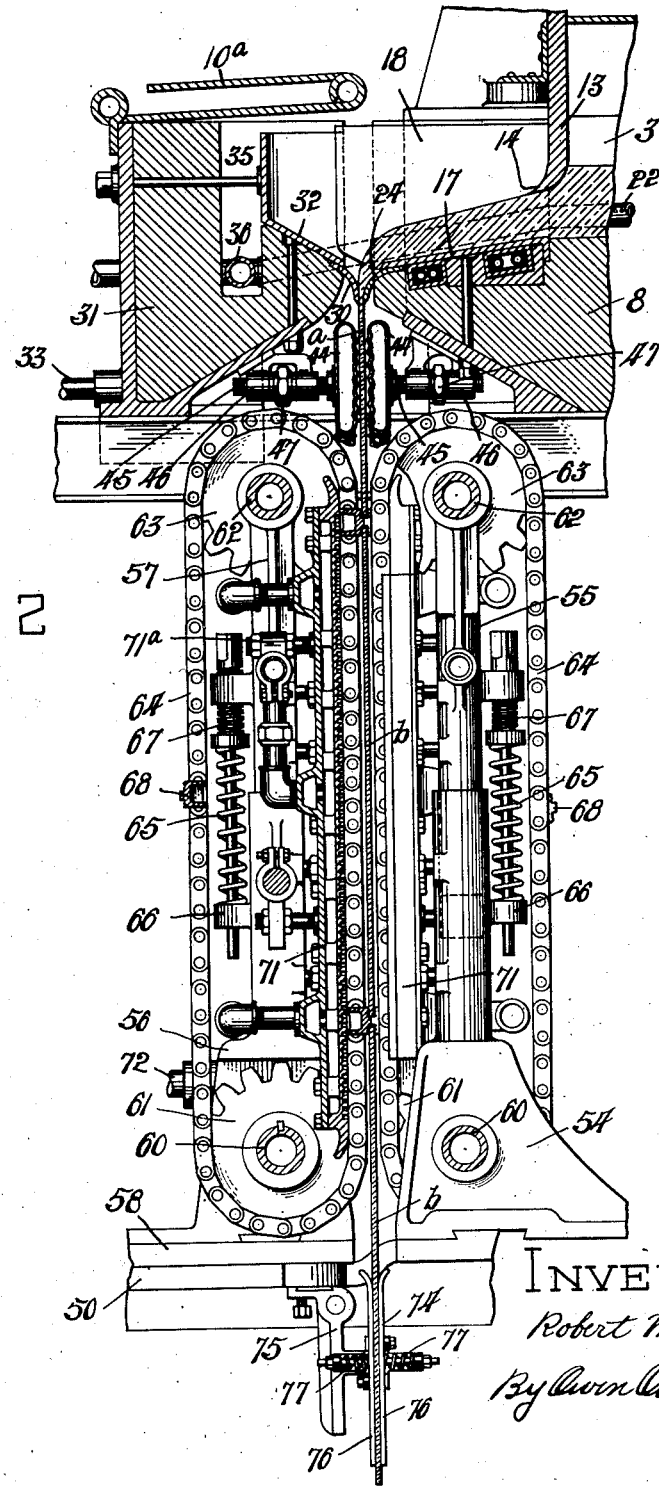

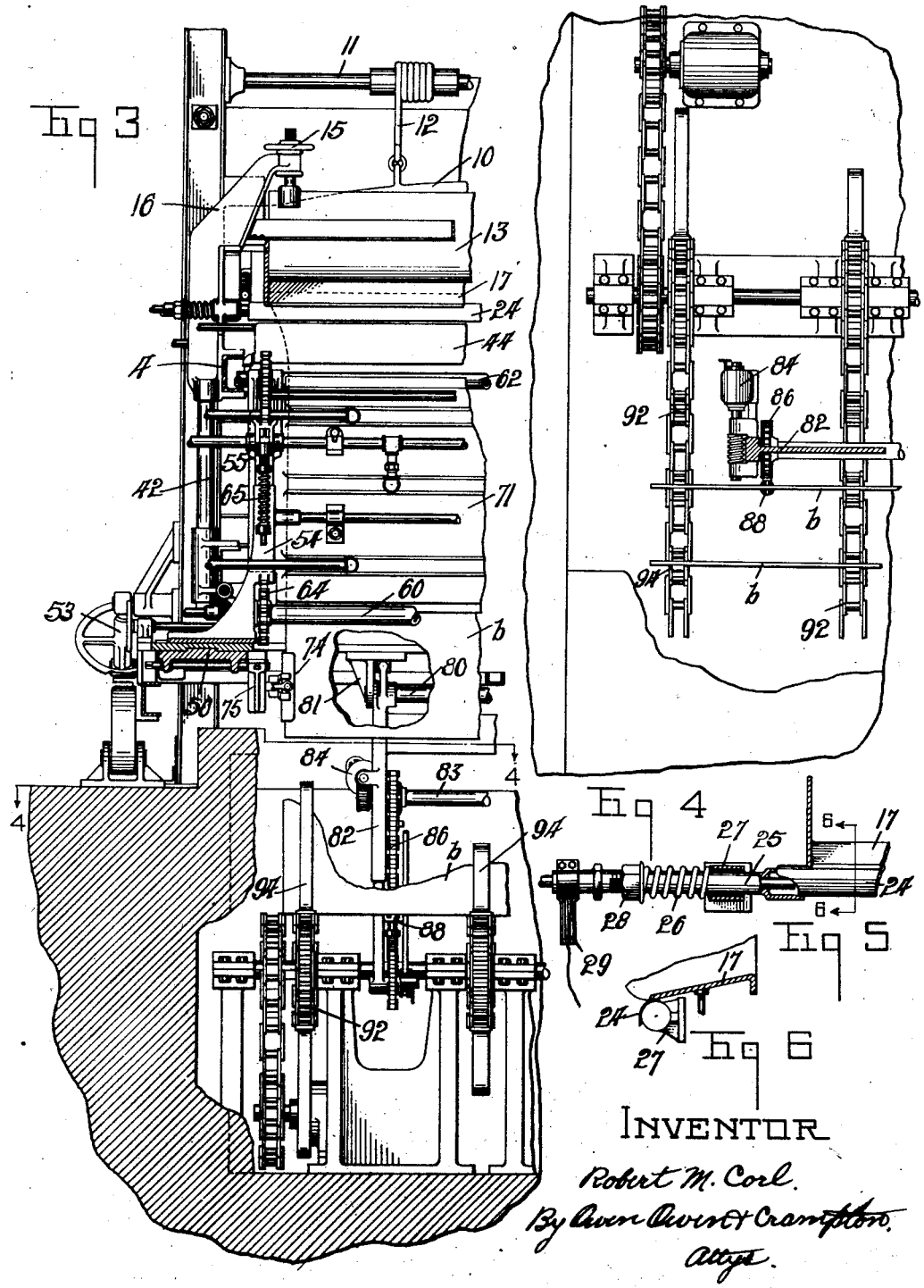

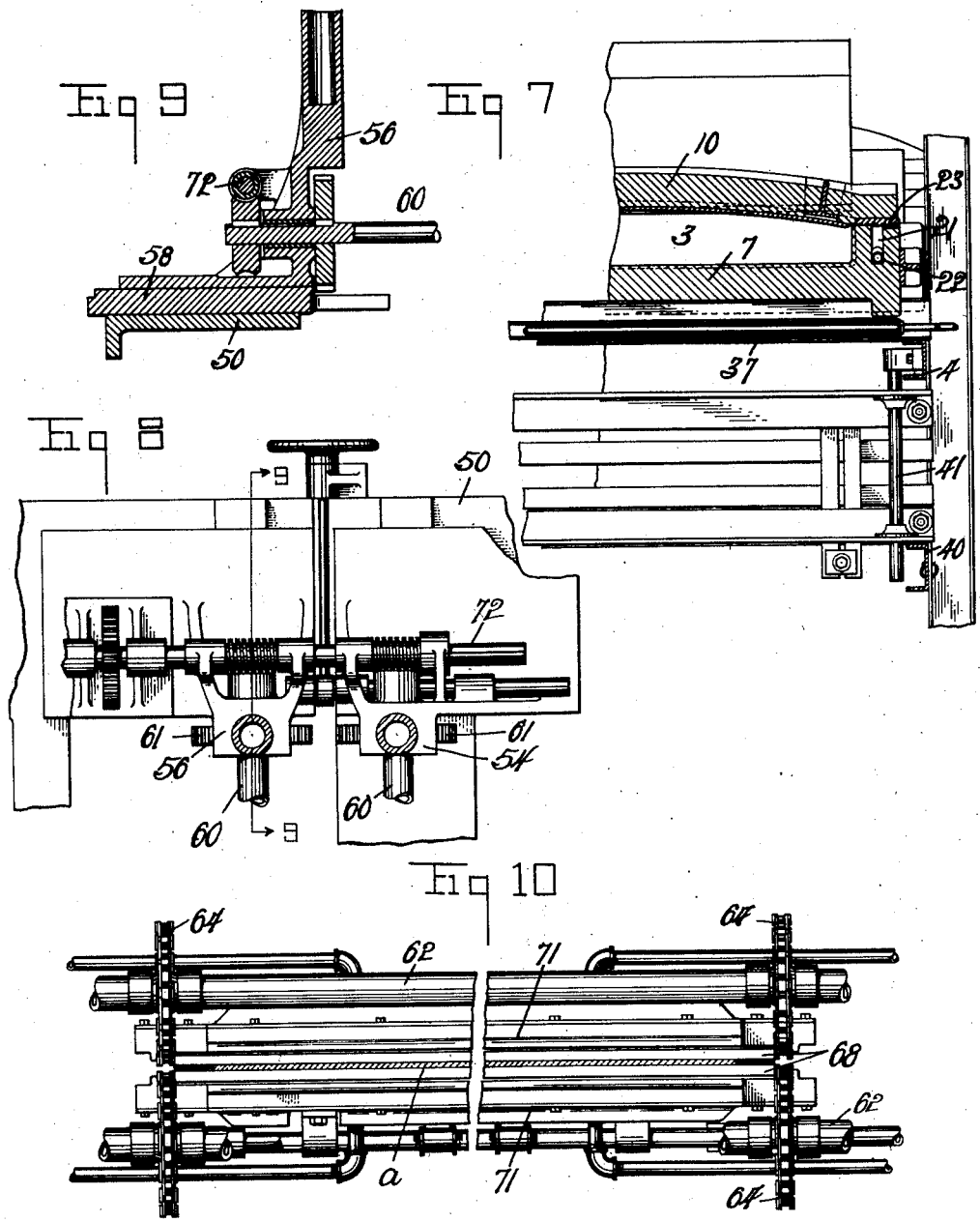

Aug. 18, 1925.  1,550,428
R. M. CORL
MANUFACTURE OF SHEET GLASS
Filed Oct. 12, 1922  5 Sheets-Sheet 5
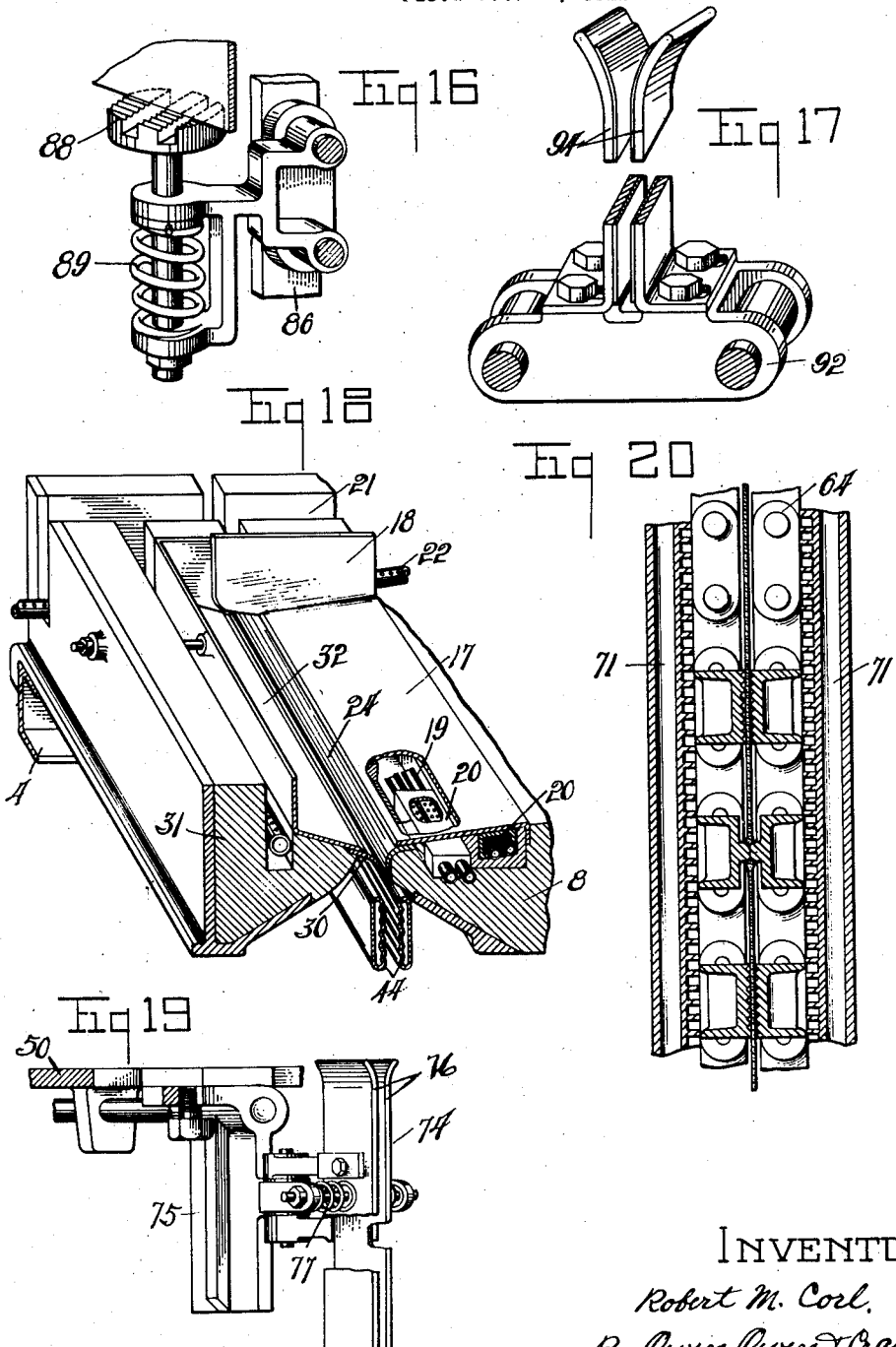
INVENTOR
Robert M. Corl.
By Owen Owen & Crampton.
Attys.

Patented Aug. 18, 1925.

1,550,428

UNITED STATES PATENT OFFICE.

ROBERT M. CORL, OF MAUMEE, OHIO, ASSIGNOR TO ERIE GLASS COMPANY, OF TOLEDO, OHIO, A CORPORATION OF DELAWARE.

MANUFACTURE OF SHEET GLASS.

Application filed October 12, 1922. Serial No. 593,967.

*To all whom it may concern:*

Be it known that I, ROBERT M. CORL, a citizen of the United States, and a resident of Maumee, in the county of Lucas and State of Ohio, have made an invention appertaining to the Manufacture of Sheet Glass; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.
This invention relates to the manufacture of glassware and particularly to the continuous forming of sheet glass.

The primary object of the invention is the provision of certain novel features for forming molten glass in sheet form whereby a regulated stream of molten glass is rapidly formed into a continuous sheet having smooth surfaces, is severed into separate sections of predetermined length and the severed sections conveyed through a leer for annealing.

The invention is fully described in the following specification, and while in its broader aspect it is capable of embodiment in numerous forms, a preferred embodiment thereof and a few modifications of some of its features are illustrated in the accompanying drawings, in which,—

Fig. 1 is a vertical longitudinal fragmentary section of an apparatus embodying the invention with parts broken away and parts removed. Fig. 2 is an enlarged view of a portion of Fig. 1. Fig. 3 is a vertical fragmentary section on the line 3—3 in Fig. 1 with parts broken away. Fig. 4 is a fragmentary section on the line 4—4 in Fig. 3. Fig. 5 is a fragmentary detail of a portion of the sheet forming lip of the apparatus with the tension means therefor and with parts broken away. Fig. 6 is a section on the line 6—6 in Fig. 5. Fig. 7 is a vertical fragmentary section on the line 7—7 in Fig. 1. Fig. 8 is an enlarged view of a portion of the drive means for the chains of the sheet severing means. Fig. 9 is a section on the line 9—9 in Fig. 8. Fig. 10 is a top fragmentary plan view of the upper end portion of the chains for the sheet severing means and the guide means therefor with parts broken away. Fig. 11 is a cross section on the line 11—11 in Fig. 1. Fig. 12 is an enlarged fragmentary vertical section of the sheet severing means with the coacting guide and sheet cooling means. Fig. 13 is a view of an end portion of one of the sheet severing bars and a portion of a carrying chain therefor with parts of the latter broken away and with the view taken on the line 13—13 in Fig. 12. Fig. 14 is a fragmentary view similar to Fig. 12 with the severing bars of the severing means slightly modified. Fig. 15 is a fragmentary sectional view of a slightly modified form of the sheet cooling means and severing chain guide. Fig. 16 is an enlarged perspective view of a portion of the sheet section supporting and lowering means. Fig. 17 is an enlarged perspective view of a portion of the sheet section carrying away chain with a part broken away. Fig. 18 is an enlarged perspective fragmentary view of the discharge end portion of the molten glass delivery trough and the associated sheet engaging means. Fig. 19 is an enlarged perspective view of one of the sheet edge engaging means for retarding the downward gravity movement of the severed or partially severed sections of the sheet in the delivery of the same to the carrying away means, with parts broken away. Fig. 20 is a fragmentary sectional view of a slightly modified form of the sheet severing means, together with the coacting sheet cooling means.

Referring to the drawings, 1 designates a furnace or chamber in which glass is melted or maintained in a melted or liquid state, and this furnace has the customary outlet opening 2 in its front through which the surface or upper portion of the molten glass flows in a regulated stream under a head or by gravity action over a discharge spout or trough 3 to a sheet forming point. The trough 3, in the present instance, is mounted on a pair of horizontally disposed base beams 4 extending forward in laterally spaced relation from the furnace front and mounted for vertical adjustment relative to the furnace, as hereinafter described. A pair of cross-beams 5 are mounted on and connect the base beams 4 in spaced relation longitudinally thereof, and, in the present instance, cooperate with a center cross block 6 to support one or more slabs 7 forming the major portion of the trough bottom.

The forward end portion of the trough bottom is formed by a cross or nose-block 8, which rests on the base beams 4. The top surface of the trough bottom is preferably forwardly and downwardly inclined to facilitate the flow of molten glass thereover, and the bottom portion of the nose-block 8 is upwardly and forwardly inclined to render the forward discharge end of the nose-block of vertically narrowed form as shown. A gate 9 is mounted over the inner end of the trough against the front side of the furnace 1 for vertical movements to open or close the communication between the furnace outlet 2 and trough, or, if desired, to regulate the quantity of flow from the furnace over the trough.

A removable cover 10 is mounted over the trough, being adapted to rest at its side edges on the side walls of the trough which extend upward from the side edges of the bottom blocks 7 and 8, the cover extending from the gate 9 preferably to a point over the bottom nose-block 8. The cover is removable from the trough in any suitable manner, as for instance, by a superposed windlass 11 and cables 12. A control gate 13 extends down at the forward end of the cover 10 to near the trough bottom at the rear of the nose portion of the block 8 and cooperates with the cover 10 and trough 3 to form a temperature reducing and glass head pressure regulating chamber for the glass flowing from the furnace. The gate 13 is preferably of a high heat resisting material, such for instance as nickel chromium, with its lower gauge edge preferably terminating in a sharp flange or lip 14 extending forward in a direction parallel to the flow of the glass. The formation of the gauging edge of the gate in this manner prevents any possibility of the glass passing a distance up the outer side of the gate by capillary attraction. The vertical adjustment of the gate may be controlled in any suitable manner, and is shown, in the present instance, as being accomplished by hand wheels 15 threaded on stems which project up through overhanging portions of the side frame brackets 16 attached to the beams 4 supporting the trough.

The top surface of the trough bottom in advance of the gate 13 is preferably formed by a metal plate 17 mounted on the top surface of the nose-block 8, and the ends of the plate are turned up to form metallic side walls 18 for the forward end portion of the trough. Immediately below the plate 17 within the block 8 are provided one or more passages extending crosswise of the trough and adapted to permit the insertion of temperature controlling means therethrough. The temperature controlling means preferably comprise fluid circulating pipes 19 adapted to be introduced into the nose-block passages from one end thereof and carrying one or more boxes or pads 20, which form chambers around predetermined portions of the circulating pipes in communication therewith through apertures therein, as shown in Fig. 18. One of these circulating chambers may be positioned at any point within the nose-block passage where it may be desired to change the temperature of a portion of the glass stream to effect an equalizing of the stream temperature throughout its width. In some cases the stream might have the edge portions thereof cooler than some other portion of its cross-section in which case it would be desirable to locate heating members within the nose block immediately below the surface plate 17 at points to effect a raising of the temperature of such cool portions of the glass. Or, it might be desirable to cool some portion of a glass stream with respect to another portion thereof, and in such event a cooling pad or member 20 would be disposed beneath the plate 17 at the point where the cooling action is desired and a cooling medium circulated therethrough.

In order to lessen the cooling or chilling effect which the side walls of a delivery trough customarily has on molten glass flowing over the trough in contact therewith, the side walls are provided with longitudinally extending passages 21 through which a burner 22 is extended. The passages 21 are provided at intervals throughout their length with escape passages 23 (Fig. 7) for the products of combustion from the burners.

The discharge edge of the nose block 8 is provided with a lip-plate 24, which, in the present instance, is separate from the plate 17, being lapped at its rear edge by the forward edge of the plate and extending therefrom in the direction of flow of the glass sheet from the discharge end of the trough. In the present instance the sheet is intended to flow by gravity over and downward from the lip-plate 24 and such plate is of curved form in cross-section with its lower edge projected downward and terminating in a thin or knife edge. The lip-plate may be heated to assist in imparting the proper surface formation to the sheet and to prevent adherence or sticking of the glass to the plate, the heating being accomplished in any suitable manner. In the present instance the plate 24 constitutes the resistance element of an electric circuit and is heated by the passage of an electric current therethrough.

For the purpose of exerting a pulling or stretching tension on the lip-plate 24, it is shown in Fig. 5 as having a stem 25 projecting from each end thereof and placed under tension by a coiled compression spring 26, which bears at one end against a bearing 27 through which the stem slides and at its other end against an adjusting nut or collar 28 on the stem. This feature of my invention, as well as the provision of a lip-plate having a substantially sharp forming edge from which the glass stream flows in forming the sheet and extending in the direction of flow of the sheet, are claimed in a separate application and therefore need not be more specifically described herein. An electrical connection for the stem 25 is shown at 29.

If desired, the lip-plate 24 may be utilized as one wall of a slot through which the molten glass flows to form the sheet, the other wall of the slot being formed by a similar plate 30 carried at the inner edge of a cross-block 31, which is mounted for adjusting movements on the base beams 4 to permit adjustment of the plate 30 to vary the width of the sheet forming slot. If the lip-plate 24 alone is used then the top or outer surface of the sheet is given the proper surface formation by heating the outwardly turned lower glass coacting edge of the gate 13. The intention is to have the last surface shaping member which has contact with the glass surfaces before passing from the sheet forming point heated to effect a proper finished surface formation to the sheet. If the control gate 13 and outer lip-plate 30 were both eliminated then no final surface forming means for the outer surface of the sheet would be needed as the top surface of the stream as it flows from the furnace to the sheet forming point would not be marred by any contacting element.

The top surface of the block 31 at its inner portion is preferably tapered inward and downward toward the forming slot and is faced with a metallic plate 32 similar to the plate 17, which laps the inner edge of the lip-plate 30 and has its front edge and ends turned up to form flanges with the end flanges lapping the forwardly extended end flanges 18 of the plate 17. It is evident that the plates 17 and 32, with their respective flanges, cooperate to form a shallow pit into which the glass may flow from the trough 3 and from which it flows downwardly in regulated sheet form through the slot formed by the lip-plates 24 and 30. One or more hand screws 33 connect the block 31 to a cross-beam 34 fixed to the outer ends of the base beams 4, and a turning of the screws impart adjusting movements to the block 31 relative to the trough 3. A cover 10ª is carried by the block 31 and adapted to be placed in position to either close or uncover the glass receiving pit formed by the slabs 7 and 31 in advance of the control gate 13. If the block 31 is employed the wall passage 21 is continued by the passage 35 within the block 31 in surrounding relation to the glass receiving pit and a branch 36 of the burner 22 is extended through this passage.

Temperature regulating devices 37 are disposed below the trough blocks 7 within the spaces 38 provided between such blocks and the base beams 4, and are preferably of a nature to effect a cooling of the trough bottom.

The beams 4 and structure supported thereby are mounted for vertical adjustment relative to the furnace 1 to enable the trough to be raised or lowered with respect to the surface line of the glass in the furnace as it may be desired to vary the depth of the stream flowing over the trough and the consequent head pressure of the glass flow. For this purpose the base beams 4 are supported by screws 39 (Fig. 1), which are supported by and rise from stationary sub-structure beams 40 and are engaged by nut members carried by a frame-work below the base beams 4 for vertical movements therewith. The nut members may be driven by a worm and worm-wheel means or in any other suitable manner. The vertical movements of the trough structure are guided by a plurality of rods 41 and 42 projecting downward therefrom through suitable guides in the subjacent frame structure. The rear end of the trough 3 and the coacting portion of the furnace front are perferably faced with metal plates 43, which provide coacting surfaces for the relatively movable sliding parts. These plates, as well as all other metal parts of the apparatus which have coaction with the molten glass are composed of a high heat resisting material, such, for instance, as nickel chromium.

Immediately below the lip-plates 24 and 30, or the formative point of the glass sheet a, are disposed a pair of hollow cooling members 44, one at each side of the sheet, which members are coextensive in length with the width of the sheet and have their inner surfaces broadened in a plane substantially parallel to the sheet and disposed adjacent thereto so that the cooling effect of a cooling medium circulating through the members will be radiated to the sheet surfaces. Each member has inlet and outlet pipes leading to and from the same through which circulation is effected. Threaded stems 45 project outward from each member 44 through brackets 46 secured to the inclined bottom surfaces of the respective blocks 8 and 31, and nuts 47 are threaded on the stems in a part of the respective brackets to effect an inward or outward adjustment of the cooling members when the nuts are turned.

A truck 50 is mounted on a frame 51 for movements toward and away from the furnace beneath the trough 3, and the frame 51 is in turn mounted on swinging links 52, which are suitably supported by a subjacent stationary structure to adapt the links to be swung lengthwise of the furnace structure and effect a corresponding raising or lowering of the truck supporting frame. The inner end of the frame, in the present instance, is connected to the stationary frame structure 40 of the furnace, in the present instance by a turn-buckle means 53 disposed at each side thereof, which means are operable to effect to raising or lowering adjustment of the frame 51, as is apparent.

A standard 54 rises from each side portion of the truck 50 at the rear or inner side of the downwardly flowing sheet *a* and is fixed to the truck against movements longitudinally thereof but is permitted to have adjustment transversely of the truck as the width of the sheet to be formed may require. Each standard 54 has a top extension member 55 in telescoped or vertical sliding connection therewith to permit longitudinal relative adjustment of the standard parts. A similar pair of standards 56, with relatively adjustable top extension parts 57, are mounted on the truck in advance of the sheet *a* for adjustment both transversely and longitudinally of the truck, the latter adjustment being permitted by mounting the standards on a base plate 58, which in turn is mounted on the truck for adjustment longitudinally thereof. The outer end of the base plate is connected to the outer end of the truck 50 by a suitable adjusting mechanism 59. The front and rear sets of standards 54 and 56 are each connected cross-wise of the sheet *a* by a respective shaft 60 each carrying a sprocket-wheel 61 adjacent to each side standard, and the upper adjustable extensions 55 and 57 of the respective standard sets are connected by respective cross-shafts 62 carrying sprocket-wheels 63 over the respective lower sprocket-wheels 61. A sprocket-chain 64 connects the sprocket-wheels 61 and 63 of each set so that a sprocket-chain is disposed adjacent to each side edge of the sheet *a* in preferably outwardly spaced relation thereto with the chains of one set opposed by the chains of the other set. A coiled compression spring 65 is disposed between a boss 66 of each standard 54 and 56 and an adjusting screw 67 carried by the respective upper extension member 55, 57 of the standard and these springs act to maintain the chains taut at all times. The inner flights of the chains 64 extend for a considerable distance in parallel relation to the downward movement of the sheet *a* and the chains of each set are connected at predetermined intervals by cross-bars 68, which, during their inner downward flights of movement with the sheet *a*, coact with opposing cross-bars of the other set of chains to grip and sever the sheet into sections of predetermined length. The bars 68, as best shown in Fig. 12, are provided with longitudinally extending central severing ribs 69, which coact to effect a biting in two, severing or weakening of a sheet disposed therebetween, and each bar at opposite sides of its biting off rib 69 is provided with a serrated or roughened gripping surface 70, which coacts with the corresponding surface of an opposed bar to grip and firmly hold the edge of a sheet adjacent to the severing line. In Fig. 14 the gripping bars, which are designated 68$^a$, are slightly modified, as shown, to effect a shearing action of the sheet as two bars come together against an interposed sheet. A further modification of the sheet feeding and severing means is shown in Fig. 20, wherein separate sets of bars are provided for severing the sheet and for gripping the sheet sections above and below the point of severing.

The inward flights of movement of the several chains and the severing bars carried thereby are guided and maintained in true parallel relation with the sheet *a* by frames 71, which, in the present instance, are made hollow to permit the circulation of a cooling medium therethrough, to accelerate the cooling and setting action of the sheet. The inner faces of the frames 71 are preferably channeled or corrugated to increase the radiating surfaces thereof. The frames 71 are intended to coact with the severing bars 68 throughout their lengths to resist an outward flexing or bowing of the bars intermediate the chains and insure a severing contact of the bars throughout their lengths. In Fig. 15 a frame 71 is shown as perforated to discharge steam against the sheet for cooling purposes.

The frames 71 are carried by the respective sets of standards 54, 56 and their top extension parts 55, 57 and have suitable pipes leading to and from the same for circulation purposes. The connections of the frames 71 with the respective lower standards 54, 56 are rigid, while the frames have sliding connections with the standard sections 55, 57, preferably through brackets 71$^a$, (the bolt receiving slots of which are not shown) to permit sufficient relative movements of the standard sections to take up slack in the chains.

The shafts 60 and 62 are preferably made of sectional form with the sections telescoped in splined relation to permit inward and outward adjustment of the chain carrying standards of each set, and the lower shafts 60 are geared at one end to a drive shaft 72 (Figs. 1, 8 and 9), which latter shaft is in connection with a motor 73 that is mounted on a forward extension of one of the front standards 56. The connection between the shafts 60 and 72, in the present instance, is through a worm and wormwheel gearing, the worm of the connection with the rear shaft 60 being splined on the shaft 72 to facilitate relative inward and outward adjustment of the different sets of standards and sheet engaging parts carried thereby.

It will be understood that the sheet engaging bars 68 in addition to severing the sheet at predetermined intervals also serve as a control or regulating means for the feed of the sheet from the forming source, and as a means for supporting the sheet so as to counteract the gravity action due to the weight of the sheet between the forming and severing points. While the chain bars support the sheet below the formation point they may sometimes accelerate the natural speed of flow of the glass when the flow becomes sluggish by reason of temperature conditions. Ordinarily, however, the speed of movement of the chain bars corresponds to the natural flowing speed of the glass at proper forming temperature from the trough or formative point and the bars prevent any acceleration of the speed of flowing by reason of the gravity action of the forming sheet. The cross-bars 68 also insure an even gravity tension condition throughout the width of the sheet. The gripping of the sheet sections at top and bottom by the cross-bars is also important, as the sections are thereby not only suspended at their top but are supported at their lower edges.

The several sheet sections $b$ after leaving the chain bars pass down through a registering opening in the truck 50 through a suitable frictional edge gripping and guiding means 74 one of which is disposed at each side edge of the sheet section and these means tend to partially support the weight of the section and retard its downward movement after being released at its upper edge by the chain bars. The retarding means 74 includes a bracket 75 that is carried by the truck 50 at its under side for adjustment transversely of the sheet and this bracket carries a pair of opposed frictional sheet edge gripping members 76, which are hinged to the bracket and are yieldingly held in opposed engagement with a sheet by tension springs 77 (Figs. 2 and 19). The upper receiving ends of the members 76 are flared outward to provide an enlarged receiving mouth for an entering sheet section.

A cross shaft 80 is mounted at the under side of the truck 50 in bearing brackets 81 depending from the truck platform and is disposed at one side of the sheet sections $b$ as they feed down through the retarding means 74. A frame arm 82 (only one of which is shown) fixedly depends from each end of the cross shaft 80 for swinging movements therewith and these arms are connected near their upper ends by a shaft 83, which is journaled therein and is in driven connection at one end with a motor 84 carried by one of the arms, as shown in Fig. 1. A sprocket wheel 85 is mounted on the shaft 83 adjacent to each arm 82 and is connected by a chain 86 to a sprocket-wheel 87, on a stub shaft at the lower end of the respective arm. Each chain is provided in equidistantly spaced relation therearound with a plurality of sheet section supporting members 88, one of which on each of the chains 86 moves into position under the lower edge of the sheet section $b$ that is lowered through the retarding means 74 to support the same and control the continued downward feeding movements thereof, the speed of movement of the chains being suitable for such purpose. The members 88 are preferably yieldingly supported by the chains through the medium of coiled compression springs 89 (Fig. 16). The arms 82 preferably comprise lower and upper longitudinally adjustable sections to facilitate taking up slack in the chains. The lower end of each arm 82 is connected by a cable or draft member 90 to a windlass 91 on the rear end portion of the truck supporting frame 51 to facilitate a swinging of the arms and associated parts to operative or inoperative positions relative to the mechanism.

A carrying away means for the sheet sections is disposed below the truck frame and is illustrated as comprising a plurality of sprocket chains 92, which are guided for lengthwise horizontal movements through a leer 93 and are adapted to receive the sheet sections $b$ as they lower with the chains 86. Each chain 92 is provided with a plurality of equidistantly spaced vertically slotted sheet guides 94 with the guides of the different chains registering in sets transversely thereof. The chains 92 are intended to have intermittent or step by step movements to successively move the sets of guides 94 thereof into vertical receiving register with a downwardly feeding sheet section $b$ and to stand at rest in such position until a section has been lowered therein by the lowering action of the chains 86. The upper flight of each chain is guided and supported for movement in a respective guide rail 95.

The operation of the apparatus is as follows: The molten glass flows by gravity action or under a forwardly crowding pressure or head from the furnace 1 or other source of supply through the closed trough 3 and under the regulating gate 14, and thence downwardly from the forward end of the trough in the form of a sheet $a$ either by passing over the lip-plate 24 at the forward end of the trough or through the sheet forming slot formed by the two lip-plates 24 and 30, the thickness of the sheet being regulated in the first instance by the depth of the glass stream permitted to flow under and past the regulating gate 13 and in the second instance, by an adjustment of the block 31 to vary the width of the sheet forming slot. The temperature of the molten glass in the furnace 1 is customarily too high for sheet forming purposes and the glass is therefore lowered in temperature in its passage over the trough, and is treated within the outer end portion of the trough for inequalities in temperature so that the glass at the sheet forming point may be of substantially uniform temperature throughout its width and depth. The equalizing of the temperature of the glass in the outer end portion of the trough is accomplished largely by a regulating of the temperature of the plate 17 on the surface of the nose block 8, and is further controlled by the heating action of the lip-plates 24 and 30 which latter are preferably, but not necessarily, heated as by the passage of an electric current therethrough. The sheet after leaving the forming lip or lips passes between a set of cooling members 44 and thence between a set of cooling frames 71, which latter are utilized to form guides for the sheet severing, carrying away and speed regulating chains 64. As the sheet lowers between the sets of chains 64 it is successively severed into sections by the severing cross-bars of the chains and the sections are gripped and supported by the cross bars until they have passed into and partially through the subjacent guiding and frictional supporting means 74. As the sheet sections lower through the guide and supporting means 74 they enter registering guides 94 on the carrying away chains 92 and at substantially the point of entering the guides 94 they rest at their lower ends on a set of supports 88 of the chains 86 and are lowered thereby into the chain guides. The supports 88 are intended to move into supporting engagement with the lower edge of a downwardly feeding sheet section at approximately the time when the upper edge of the section is released by the gripping bars of the chains 64. It will be understood that the chains 92 carry the sheet section through the leer 93 for annealing purposes.

It will be understood that while I have described a particular mechanism for forming molten glass into sheet form, supporting the same, severing it into sections, and transferring the sections to and through a leer, the different parts of the mechanism are capable of numerous modifications and changes and are not restricted to use in connection with the particular combination and arrangement shown and described.

Having thus described my invention, what I claim as new, and desire to secure by Letters Patent, is,—

1. The method of producing glass in sheet form consisting in allowing molten glass to take a sheet form by crowding it past a forming means to cause it to flow downward therefrom, and supporting the formed sheet by contact with its surface at intervals across its width after passing from the forming means and maintaining the supports in contact with the same portions of the surface until substantially set.

2. The method of producing glass in sheet form consisting in allowing molten glass to take a sheet form by crowding it past a forming means to cause it to flow downward therefrom, supporting the formed sheet by contact with its surface across its width after passing from the forming means and until substantially set and maintaining the supports in contact with the same portions of the surface subjecting the sheet to a forced cooling after flowing from the forming means.

3. The method of producing glass in sheet form, consisting in allowing molten glass to take a sheet form by crowding it past a forming means to cause it to flow downward therefrom by gravity, supporting the formed sheet entirely across its width at predetermined intervals after passing from the forming means and until substantially set, and severing the sheet at the points of support while in a soft condition.

4. The method of producing glass in sheet form, consisting in allowing molten glass to take a sheet form by crowding it past a forming means and causing it to flow downward therefrom by gravity, severing the formed sheet at intervals after leaving the forming means, and simultaneously gripping the sheet across its width above and below each point of severing and adjacent thereto.

5. The method of producing glass in sheet form, consisting in flowing molten glass by gravity over and vertically downward from a metallic sheet forming means heated to a point to prevent adherence of the glass thereto and supporting the formed sheet across its width after passing from the forming means and until substantially set.

6. The method of forming glass in sheet form, consisting in flowing molten glass under a head over a highly heated metallic forming means and vertically downward therefrom in sheet form, gripping and supporting the sheet at intervals across its width as it flows from the forming means, the gripping means remaining in supporting contact with the sheet and moving therewith until the sheet has become substantially set.

7. The method of forming glass in sheet form, consisting in flowing molten glass under a head through a sheet forming opening having heated metallic walls, the formed sheet flowing vertically downward by gravity from the opening, and supporting the soft sheet at intervals entirely across its width as it flows from the forming opening, the supporting means gripping and remaining in engagement with the sheet until the sheet is substantially set.

8. The method of producing glass in sheet form, consisting in flowing molten glass under a head through a sheet forming slot having heated metallic side walls, gripping the sheet at intervals entirely across its width from near its point of flow from the slot to a point where it is substantially set whereby the glass in the sheet is uniformly supported throughout its width, and severing the sheet simultaneously with the gripping and adjacent to the gripping points.

9. The method of forming glass in sheet form, consisting in passing molten glass over or through a heated forming and finishing means downward from which the glass flows by gravity in sheet form, and supporting the central portion of the formed sheet from a point near the forming means to a point where the sheet is substantially set.

10. The method of forming glass in sheet form which consists in flowing the sheet by gravity from a molten source of supply through a temperature reducing means and thence downward in sheet form over a heated metallic forming edge, gripping and supporting the sheet across its width from a point near the forming edge to a point where the sheet is substantially set, the gripping means moving with and controlling the downward movement of the sheet.

11. The method of forming glass in sheet form which consists in flowing the sheet by gravity from a molten source of supply through a temperature reducing means and thence downward in sheet form past a metallic forming edge, gripping and supporting the sheet across its width from a point near the forming edge to a point where the sheet is substantially set, the gripping means moving with and controlling the downward movement of the sheet, and severing the sheet into longitudinally spaced sections during the period of gripping of the same by the gripping means.

12. The method of manufacturing sheet glass consisting in flowing molten glass by gravity past a heated sheet forming member in contact therewith, thence downward in sheet form therefrom, severing the sheet into longitudinally spaced sections while still soft, gripping the sheet above and below each severing point before the severing action and maintaining supporting engagement with the respective upper and lower edges of the sheet sections during a predetermined portion of their movements and then successively releasing the sections.

13. The method of manufacturing sheet glass consisting in flowing molten glass by gravity past a heated sheet forming member in contact therewith, thence downward in sheet form therefrom, severing the sheet into longitudinally spaced sections while still soft, gripping the sheet above and below each severing point before the severing action and maintaining supporting engagement with the respective upper and lower edges of the sheet sections during a predetermined portion of their movement and then successively releasing the sections, and passing the released sections through a frictional means which retards the gravity movement thereof.

14. The method of manufacturing sheet glass consisting in flowing molten glass by gravity past a heated sheet forming means in contact therewith, thence downward in sheet form therefrom, severing the sheet into longitudinally spaced sections while still soft, gripping the sheet above and below each severing point before the severing action and maintaining supporting engagement with the respective upper and lower edges of the sheet sections during a predetermined portion of their movement and then successively releasing the sections, and subjecting the sheet and sections to a cooling action during the gripping and severing period.

15. In the manufacture of sheet glass wherein the sheet is formed by the gravity flow of molten glass past a forming means, means continuously moving into gripping engagement with the sheet adjacent to its forming point and moving and remaining in gripping and supporting contact therewith until the sheet has become substantially set, the gripping action taking place entirely across the sheet.

16. In the manufacture of sheet glass wherein the sheet is formed by the gravity flow of molten glass over or through a forming means, a gripping means for successively gripping the sheet at a point near the forming means and moving with and remaining in supporting contact therewith across the width of the same until the sheet has become substantially set, and means for severing the sheet during a gripping thereof by the gripping means, the gripping action taking place immediately above and below each point of severing to support the sheet sections.

17. In the manufacture of sheet glass wherein the glass is formed by passing the glass over or through a heated metallic forming means, a gripping and severing means of endless chain form for gripping and severing the sheet throughout its width at predetermined longitudinally spaced intervals.

18. In the manufacture of sheet glass wherein the glass is formed by passing the glass over or through a heated forming means, means of endless chain form for intermittently gripping and supporting the sheet while soft at predetermined longitudinally spaced intervals to control the gravity action on the plastic sheet across its width while cooling.

19. In an apparatus for forming sheet glass, means over which molten glass flows from a source of supply and downward from which it flows by gravity in sheet form, a set of chains at each side of the sheet having their inner flights adjacent to the sheet and movable a distance in parallel with the movement of the sheet, and means having parts carried at intervals by the chains at opposite sides of the sheet and co-operating to grip the sheet across its width while soft and also to sever the sheet at points intermediate the edges of each point of gripping.

20. In an apparatus for manufacturing sheet glass, means from which molten glass flows downward by gravity in sheet form from a source of molten glass supply, and means for gripping the sheet entirely across its width at intervals longitudinally thereof and supporting the sheet in its downward movement until substantially set.

21. In an apparatus for manufacturing sheet glass, means from which molten glass flows downward by gravity in sheet form from a source of molten glass supply, and means for gripping the sheet across its width at intervals longitudinally thereof and supporting the sheet during its downward movement until substantially set, and also acting to sever the sheet intermediate the edges of each point of gripping of the sheet.

22. In an apparatus of the class described, means from which molten glass flows downward by gravity in sheet form from a source of molten glass supply, means horizontally adjustable below the point of said means from which the sheet flows and operable to grip and support the flowing sheet entirely across its width at predetermined spaced intervals longitudinally thereof and to move with and remain in supporting engagement with the sheet until it has substantially set.

23. In an apparatus of the class described, means from which molten glass flows downward by gravity in sheet form from a source of molten glass supply, means for gripping and supporting the sheet entirely across its width at intervals for a predetermined period before the sheet is set, and also severing the sheet into sections, and means for guiding and controlling the gravity movement of the sheet sections after being released by the gripping and severing means.

24. In an apparatus of the class described, means from which molten glass flows by gravity in sheet form from a source of supply, means below the first means adjacent thereto for gripping the sheet entirely across its width and controlling the gravity movement thereof and also acting to sever the sheet into sections, frictional means for engaging and retarding the gravity movements of the sheet sections after being released by the gripping and severing means, a conveying away means, and means for controlling the gravity movements of the sections from the frictional engaging means to the carrying away means.

25. In an apparatus of the class described, means from which molten glass flows by gravity in sheet form from a source of supply, means forming cooling members at opposite sides of the sheet adjacent to the forming means, and means having a plurality of cross members adapted to engage and move a distance with the sheet in supporting engagement therewith and guided during such movement by the cooling members.

26. In an apparatus of the class described, means downward from which molten glass flows by gravity in sheet form from a source of supply, and a sheet supporting and severing unit mounted below the forming means for adjustment relative thereto and having members operating to grip the glass across its width at successive intervals while in a soft condition and move a distance with the sheet and to sever it into sections during such movement.

27. In a machine of the class described, means from which molten glass flows downward by gravity in sheet form from a source of supply, and a sheet supporting and severing unit disposed below the forming means for successively engaging, moving a distance with, and severing a sheet into sections, said unit including opposed sets of endless chains with cross sheet gripping and severing bars connecting the chains of each set, and means for driving the chains in unison.

28. In a machine of the class described, means from which molten glass flows downward by gravity in sheet form from a source of supply, and a sheet supporting and severing unit disposed below the forming means for successively engaging, moving a distance with, and severing a sheet into sections while still soft, said unit including opposed sets of endless chains with cross sheet gripping and severing bars connecting the chains of each set, means for driving the chains in unison, and means receiving the sheet sections as they are released by the gripping and severing means and controlling the downward gravity feeding movements thereof.

29. In an apparatus of the class described, means from which molten glass flows downward by gravity in sheet form from a source of supply, means for engaging the sheet while soft, supporting the same for a distance of its movement uniformly across its width and severing the sheet into sections, a carrying-away means for the sheet sections, and means for engaging the lower edge of each sheet section and controlling the movement thereof to the carrying away means after the section leaves the gripping and severing means, and means for guiding the movements of the sheet sections from the gripping and severing means to the carrying-away means.

30. In an apparatus of the class described, means from which molten glass flows downward in sheet form by gravity from a source of supply, means operable to act on the sheet while soft to sever the same into sections and to control for a distance the downward movements of the sheet and section, and means movable into and out of usable position for supporting and controlling a further predetermined lowering movement of the sections after leaving the gripping and severing means.

31. In an apparatus of the class described, means from which molten glass flows downward by gravity in sheet form from a source of supply, and a unit mounted for vertical and horizontal adjustment below the sheet delivery point of said means for gripping the sheet while soft to support and control the gravity movement thereof and also operable to sever the sheet at the gripping points.

32. In an apparatus of the class described, means from which molten glass flows by gravity in sheet form from a source of supply, a vertically adjustable frame below the sheet forming point of said means, a truck adjustably mounted on the frame, and means carried by the truck and operable to engage, support and control the downward feeding movements of the sheet while in a soft condition.

33. In an apparatus of the class described, means from which molten glass flows by gravity in sheet form from a source of supply, a vertically adjustable frame below the sheet forming point of said means, a truck adjustably mounted on the frame, and means carried by the truck and operable to engage, support and control the downward feeding movements of the sheet while in a soft condition and to sever the sheet into successive sections.

34. In an apparatus of the class described, means from which molten glass flows by gravity in sheet form from a source of supply, a vertically adjustable frame below the sheet forming point of said means, a truck adjustably mounted on the frame, means carried by the truck and operable to engage, support and control the downward feeding movements of the sheet while in a soft condition and to sever the sheet into successive sections, and means carried by the truck for receiving and controlling the further lowering movements of the sheet sections after being released by the supporting and severing means.

35. In an apparatus of the class described, directing means over which molten glass flows to a sheet forming point, a transverse passage in the means below the glass directing surface thereof, and means including circulating pads in communication with a source of temperature controlling fluid adjustable in the passage to regulate the temperature of a predetermined portion of the superposed directing surface.

36. In an apparatus of the class described, means for directing the flow of molten glass to a sheet forming point and terminating at the sheet forming point in a heated lip-plate and having a temperature controlling surface plate extending a distance rearwardly from the lip-plate, and means for controlling the temperature of the surface plate.

37. In an apparatus of the class described, means for directing the flow of molten glass to a sheet forming point and terminating at the sheet forming point in an electrically heated lip-plate and having a temperature controlling surface plate extending a distance rearwardly from the lip-plate, and means adjustable within the directing means below the surface plate for controlling the temperature of predetermined portions thereof.

38. In an apparatus for manufacturing sheet glass, means to hold a supply of molten glass from which the glass sheet is formed, and means for gripping the sheet across its width at intervals longitudinally thereof and to support the sheet in its movement until substantially set and also acting to sever the sheet intermediate the edges of each point of gripping of the sheet.

39. In an apparatus for manufacturing sheet glass, means to hold a supply of molten glass from which the glass sheet is formed, and means having opposed members at each side of the sheet for gripping the sheet across its width at spaced intervals longitudinally thereof and continuing in engagement therewith during a predetermined length of movement of the sheet and having provision for severing the sheet intermediate the edges of each point of gripping of the sheet.

In testimony whereof I have hereunto signed my name to this specification.

ROBERT M. CORL.